(12) United States Patent
Haugh

(10) Patent No.: US 7,219,096 B2
(45) Date of Patent: May 15, 2007

(54) METHOD FOR MIGRATING OPEN FILES ON A BUSY FILE SYSTEM

(75) Inventor: Julianne Frances Haugh, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 658 days.

(21) Appl. No.: 10/165,086

(22) Filed: Jun. 6, 2002

(65) Prior Publication Data
US 2003/0229609 A1 Dec. 11, 2003

(51) Int. Cl.
*G06F 17/30* (2006.01)
(52) U.S. Cl. ............................................... 707/8; 707/1
(58) Field of Classification Search .................. 707/1–3, 707/200–205
See application file for complete search history.

(56) References Cited

U.S. PATENT DOCUMENTS

2002/0065837 A1* 5/2002 Roach et al. ............... 707/200
2002/0133491 A1* 9/2002 Sim et al. ..................... 707/10

* cited by examiner

Primary Examiner—Alford W. Kindred
(74) Attorney, Agent, or Firm—Duke W. Yee; Diana R. Gerhardt; Gerald H. Glanzman

(57) ABSTRACT

A process by which a system moves an open file from one location to another, then closes the open file on the former open file system. This migration affects all open instances of the file system object so that the file descriptors shared between open files remain shared after the migration operation. The innovative system and method can be used to move individual open files or mounted file systems within a hierarchical file system. Processes accessing the open files are not interrupted.

23 Claims, 3 Drawing Sheets

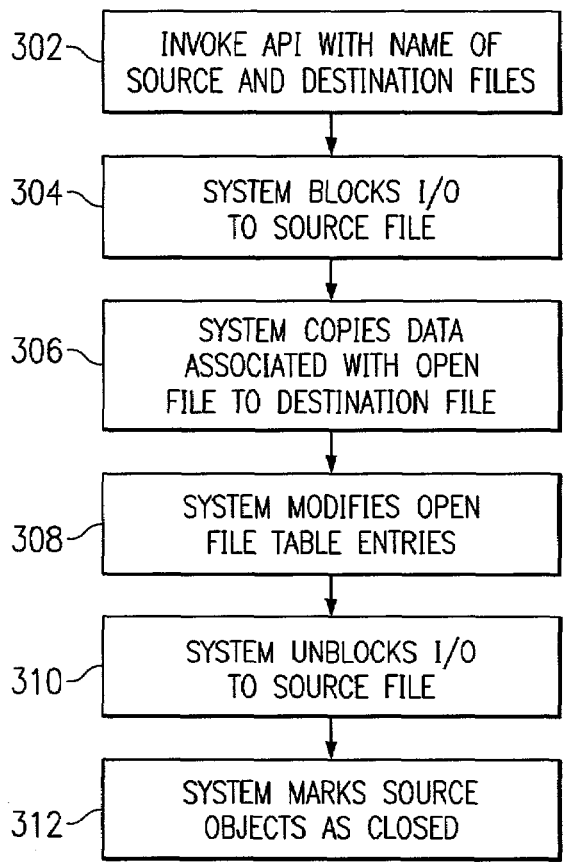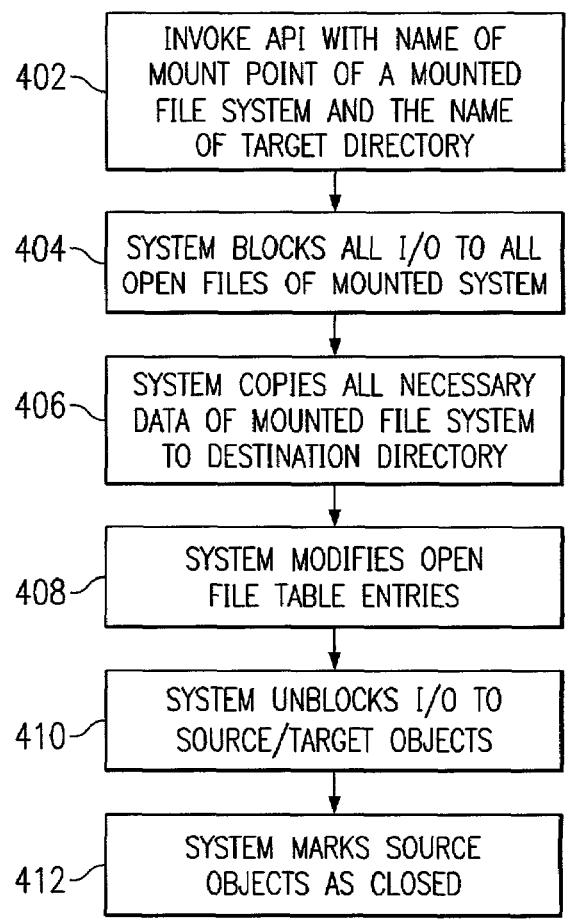

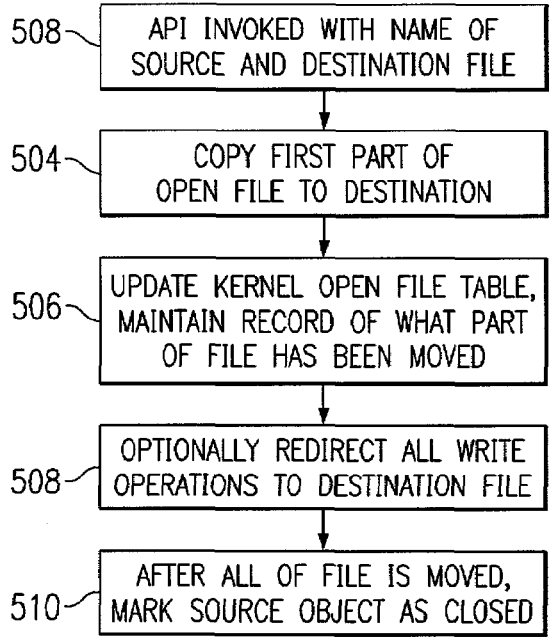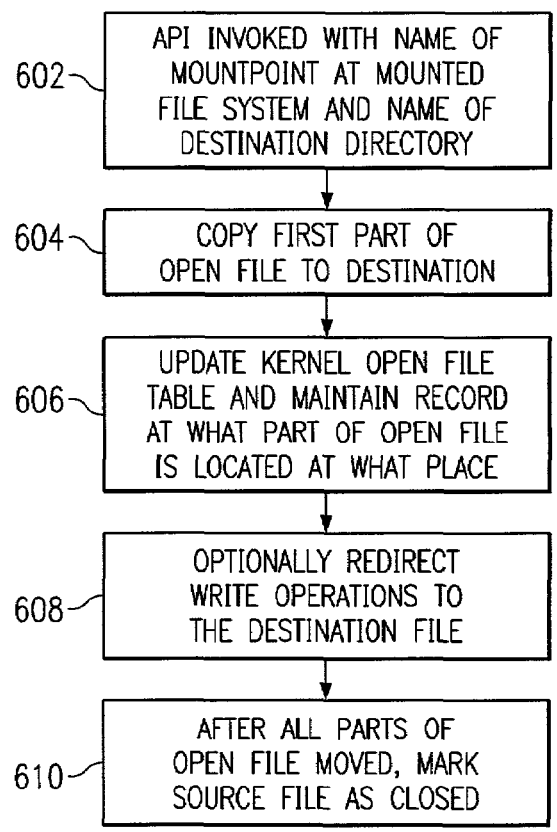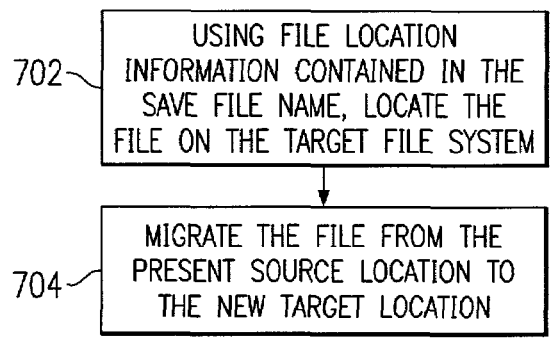

METHOD FOR MIGRATING OPEN FILES ON A BUSY FILE SYSTEM

BACKGROUND OF THE INVENTION

1. Technical Field

The present innovations relate generally to hierarchical file systems in computers, and more particularly to migration of open files on a busy file system.

2. Description of Related Art

UNIX-compatible operating systems provide a hierarchical file system structure, starting at a root directory. Additional file system hierarchies may be added to the initial file system hierarchy by means of a "mount" operation. A mount operation causes the system's hierarchical file system structure to include all of the files and directories presented by the newly added file system.

Removal of a mounted file system hierarchy requires that either all of the open files on the file system be closed, or a "force unmount" operation may be performed. Neither of these methods is optimal.

Requiring all the open files on the file system to be closed means that processes which are then running that use the open files must be interrupted to close the relevant files.

Operating systems assign a unique number to an opened file for its internal management. This number, or handle, unambiguously characterizes the opened file. Typically, if an open file is moved on a file system using a force unmount, the process will receive an error indicating that the file handle is stale, which results in aborting the program due to the error.

Another solution to unmounting open files exists in the checkpoint/restart facility. In that facility a process and all its state information is captured in a disk file for later restart. This facility could be used to "free up" a mounted file system. However, the amount of disk space used by a checkpointed process is substantial. This also assumes that the checkpoint operation was of the form where the process is forced to exit since otherwise the target file system still has a busy file. This solution does not require that the entire process state be saved, only that the contents of the open files be saved. Though the process does remain running, it is unavailable between the time it is checkpointed and the time it is restarted.

SUMMARY OF THE INVENTION

The present innovations solve the problem of taking file systems off line to migrate them by making it possible to continue production without receiving "stale file system handle" errors, and without prematurely terminating the processes using open files within the set of migrated files.

In a preferred embodiment, this is achieved by migrating the data in the file system object to another location in the file system hierarchy and updating the kernel open file table. This migration affects all open instances of the file system object so that the file descriptors shared between open files remain shared after the migration operation.

One set of embodiments of the present innovations blocks I/O requests to the open file or files while they are being moved. While this can delay a process that requires the open file, such a process will not be interrupted or halted by the I/O blocking. Once the transfer is complete, the process accesses the open file at the new location.

In another set of embodiments, the open file is moved piecemeal. A record is maintained of what part of the file is in what location, so that I/O calls to the file can be directed to the proper place. In some variations of this embodiment, all write requests are redirected to the new location.

These embodiments can be applied to single open files, to all specific files on a file system used by a specific process, or to all files on a specific file system for all processes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 shows a process flow for a preferred embodiment.
FIG. 4 shows a process flow for a preferred embodiment.
FIG. 5 shows a process flow for a preferred embodiment.
FIG. 6 shows a process flow for a preferred embodiment.
FIG. 7 shows a process flow for a preferred embodiment.

DETAILED DESCRIPTION OF THE PREFERRED EMBODIMENT

The present invention is described with reference to the figures. The preferred embodiments are intended to teach the invention by way of example, and not by way of limitation. It will be evident to those of skill in the art that the specific implementation can be varied while still remaining within the innovative concept of the present invention.

Figure 1:
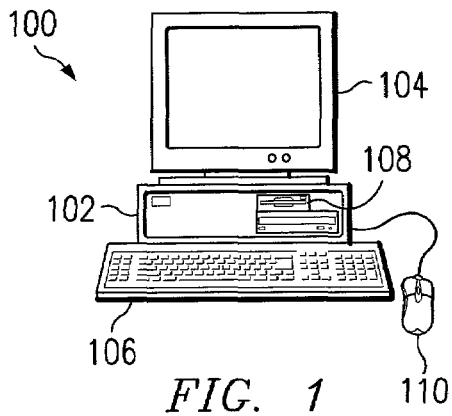
FIG. 1 shows a pictorial representation of a computer system.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
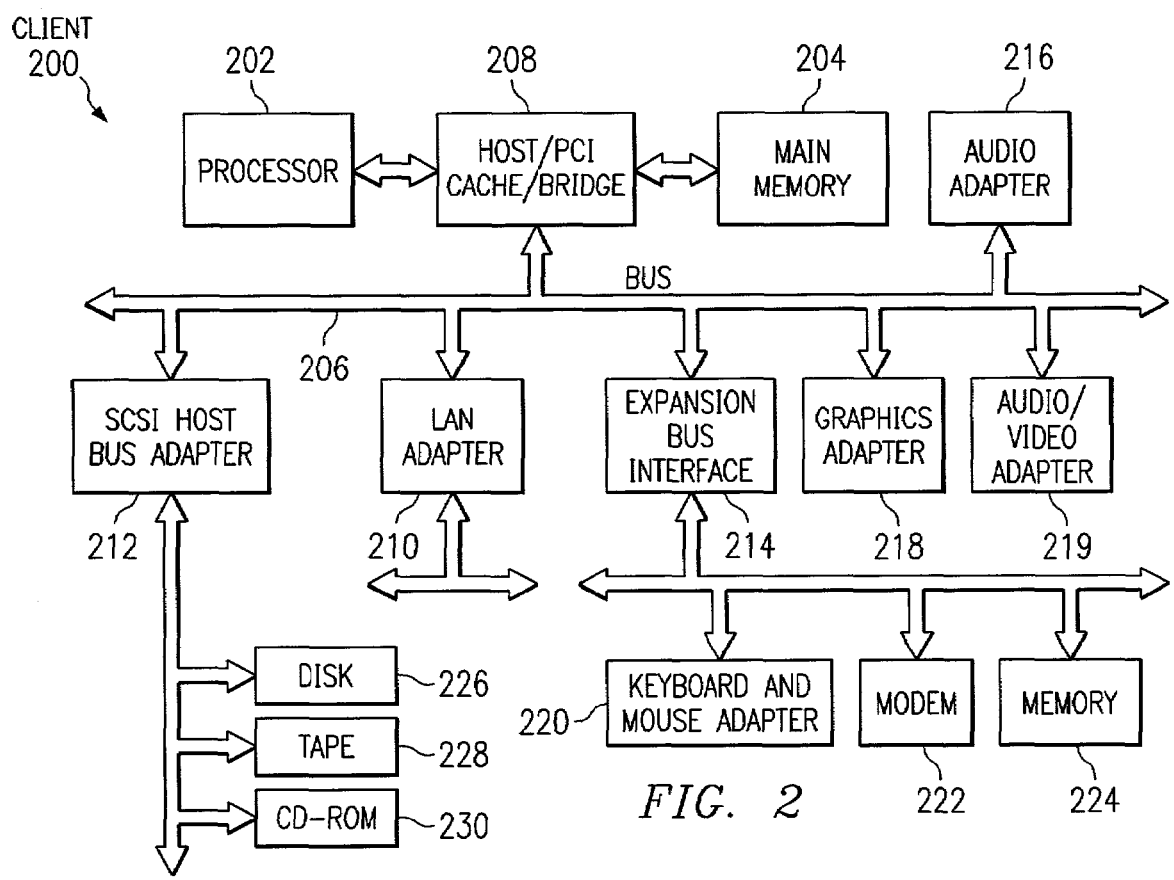
FIG. 2 shows a block diagram of the data processing system consistent for use with preferred embodiments.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

The present invention describes a process by which the system migrates an open file from one file system location to another, then closes the file on the former open file system. This migration affects all opened instances of the file system object, so that file descriptors shared between open files remain shared after the migration operation.

The innovative system moves open files within a hierarchical file system by making it possible to continue production without receiving "stale file system handle" errors or prematurely terminating the process. It achieves this by migrating the data in the file system object to another location in the file system hierarchy and updating the kernel open file tables.

Typically, a kernel (or any comparable center of an operating system) includes an interrupt handler that handles all requests or completed I/O (input/output) operations that compete for the kernel's services, a scheduler that determines which programs share the kernel's processing time in what order, and a supervisor that actually gives use of the computer to each process when it is scheduled. A kernel may also include a manager of the operating system's address spaces in memory or storage, sharing these among all components and other users of the kernel's services.

The present innovations apply to moving individual open files on a hierarchical file system as well as moving mounted file systems. Files can therefore be moved on an individual basis (only named files are moved), on a per process basis (all files on a specific file system for a specific process are moved), or on a per file system basis (all files on a specific file system for all processes are moved).

In a first set of embodiments of the present invention, the system blocks I/O briefly while open files are migrated, updating the open file tables of the kernel so that I/O calls to the old location of the open file will be redirected to the open file's new location. This embodiment does not cause processes using the open file to be terminated.

In a second set of embodiments, the open files are moved incrementally, and I/O calls are directed to the new location if that part of the file has been moved, or to the old location of that part of the file has not been moved. The kernel open file table keeps a record of what part of the open file has been moved.

FIG. 3 shows a process flow for one embodiment. First, an API (application program interface) is invoked with the name of an existing open file and the name of the destination file (step 302). Next the system blocks I/O to the named open file (step 304). The system then copies the necessary data associated with the named open file to the named destination file (step 306).

The system then modifies the appropriate open file table entries such that the system's open file table reference for the named open file is replaced with the information needed to access the target objects in their new locations (step 308). The system next unblocks I/O to the objects which were previously blocked in step 304 (step 310). The system then marks the source objects as being closed (step 312).

This innovative process for moving files can be applied to files within a mounted file system, thereby allowing open file systems to be unmounted. Other sets of files can also be migrated in this way, such as all files associated with a particular process, whether the open files are within a single mounted file system or not.

When applied to multiple files, such as the example of unmounting a file system, FIG. 4 describes a preferred process flow.

First, an API is invoked with the name of the mount point of an existing mounted file system and the name of the destination directory (step 402). Next the system blocks I/O to all the open files on the mounted file system (step 404). The system then copies all necessary data associated with the named mounted file system to the named destination directory (step 406).

The system then modifies the appropriate open file table entries such that the system's open file table references for open objects in the named mounted directory are replaced with the information needed to access the target objects in their new locations (step 408). The system next unblocks I/O to the objects which were previously blocked in step 404 (step 410). The system then marks the source objects as being closed (step 312).

This mechanism has advantages over the prior art in that processes which don't require access to the file can be allowed to continue without delay or interruption (rather than automatically being interrupted as in existing systems). This can be exploited by a multi-thread application, or by an application which performs asynchronous I/O.

The process flow of FIG. 4 can also be applied to moving sets of files that include files both from within a single mounted file system and outside a mounted file system. Though blocking the I/O while moving a particular file delays a process using the open file, the process need not be terminated and no stale file handle errors will result.

Another set of embodiments includes a process that allows migration of open objects without the need to block I/O or delay processes using the open files to be moved. In this embodiment, open files are moved incrementally or piecemeal, and the kernel open file table keeps a record indicating which portions of a file have been migrated. The mechanism for migrating the file can also include redirecting write requests so that all file write operations are stored in the new location. Of course, this variation would include a means of preventing overwriting of newer data at the destination location with old data that is later migrated there.

FIG. 5 shows a process flow for a preferred embodiment, applying to a single open file. First, an API is invoked with the name of an existing open file and the name of the destination file (step 502). The system then copies a first part of the open file to the destination (step 504) and updates the kernel open file table, which also maintains a record indicating what part of the open file has been moved (step 506). If a process calls the open file for a write operation, the write request is optionally redirected to write to the destination (step 508). After all parts of the open file have been moved, the system marks the source object as being closed (step 510).

FIG. 6 shows a similar process flow applying to the migration of mounted files or other sets of multiple open files. First, an API is invoked with the name of the mount point of an existing mounted file system, and the name of the destination directory (step 602). The system then copies a first part of an open file in the mounted file system to the destination (step 604) and updates the kernel open file table, which also maintains a record indicating what part of the open file has been moved (step 606). If a process calls the open file for a write operation, the write request is optionally redirected to write to the destination (step 608). After all parts of the mounted file system have been moved, the system marks the source objects as being closed (step 610).

In the case where these innovations are used to migrate the contents of an entire open file system, the system creates filenames in the target directory such that sufficient information is maintained so that an "undo" operation can be performed. In this instance, either a library routine or system call is given the name of the directory containing the saved files and the name of the mount point where the file system has been remounted. FIG. 7 shows the steps to be performed in order to remigrate all of the saved files back to the original system. For each file in the named directory, the following steps are performed: First, using the file location information contained in the saved file name, locate the file on the target file system (step 702). Then migrate the file from the present source location to the new target location (i.e., the original location of the file) using the same steps described for the initial migration of a single named file (step 704).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of moving open files, the method comprising:
    blocking input and output requests to an open file stored at a first location;
    copying the open file from the first location to a second location;
    redirecting the blocked input and output requests to the open file from the first location to the second location; and
    unblocking the blocked input and output requests to the open file after the open file has been copied to the second location.

2. The method of claim 1, further comprising the step of marking the open file as being closed.

3. The method of claim 1, further comprising the step of maintaining sufficient information to move the open file back to the first location.

4. The method of claim 3, wherein the sufficient information is maintained in the second location.

5. A computer implemented method of moving a set of open files on a hierarchical file system, the method comprising:
    blocking input and output requests to a set of open files;
    copying the set of open files from a first location to a target directory;
    redirecting the blocked input and output requests to the set of open files from the first location to the target directory; and unblocking the blocked input and output requests to the set of open files after the set of open files has been copied to the second location.

6. The method of claim 5, wherein the set of open files comprises all open files on a file system that are accessed by a specific process.

7. The method of claim 5, wherein the set of open files comprises all open files of a mounted file system that are accessed by all processes.

8. The method of claim 7, wherein a process accessing a closed file of the mounted file system is not interrupted.

9. The method of claim 5, further comprising the step of:
creating filenames to maintain sufficient information to move the set of open files back to the first location.

10. The method of claim 9, wherein the sufficient information is maintained in the target directory.

11. A computer implemented method of moving open files, the method comprising:
blocking input and output requests to a first part of an open file stored at a first location;
copying the first part of the open file from the first location to a second location;
redirecting the blocked input and output requests for the first part of the open file from the first location to the second location;
unblocking the blocked input and output requests to the first part of the open file after the first part of the open file has been copied to the second location;
blocking input and output requests to a second part of the open file stored at the first location;
copying the second part of the open file from the first location to the second location;
redirecting the blocked input and output requests for the second part of the open file from the first location to the second location; and
unblocking the blocked input and output requests to the second part of the open file after the second part of the open file has been copied to the second location.

12. The method of claim 11, wherein a process accessing the open file is not interrupted.

13. The method of claim 11, further comprising the step of maintaining a record indicating what parts of the open file have been moved to the second location.

14. The method of claim 11, further comprising the step of maintaining sufficient information to move the open file back to the first location.

15. A computer implemented method of moving open files on a file system, the method comprising:
blocking input and output requests to a first part of an open file stored at a source directory;
copying the first part of the open file from the source directory to a target directory;
updating a record of what part of the open file has been moved;
redirecting the blocked input and output requests for the first part of the open file from the source directory to the target directory;
unblocking the blocked input and output requests to the first part of the open file after the first part of the oven file has been copied to the target directory; and
wherein processes using the open file are not interrupted.

16. The method of claim 15, further comprising the step of redirecting all write operations to the open file to the target directory.

17. The method of claim 15, further comprising the steps of:

creating filenames in the target directory to maintain sufficient information to move the open file back to the source directory.

18. A computer system, comprising:
a first storage location;
a second storage location; and
a file handling mechanism;
wherein the file handling mechanism blocks input and output requests to an open file stored at the first storage location, copies the open file from the first storage location to a second storage location, redirects the blocked input and output requests to the open file from the first storage location to the second storage location, and unblocks the blocked input and output requests to the open file after the open file has been copied to the second storage location.

19. A computer system, comprising:
a first storage location;
a second storage location; and
a file handling mechanism;
wherein the file handling mechanism blocks input and output requests to a first part of an open file stored at the first storage location, copies the first part of the open file from the first storage location to a second storage location, redirects the blocked input and output requests to the first part of the open file from the first storage location to the second storage location, unblocks the blocked input and output requests to the first part of the open file after the first part of the open file has been copied to the second storage location, blocks input and output requests to a second part of the open file stored at the first storage location, copies the second part of the open file from the first storage location to the second storage location, redirects the blocked input and output requests to the second part of the open file from the first storage location to the second storage location, and unblocks the blocked input and output requests to the second part of the open file after the second part of the open file has been copied to the second storage location.

20. The system of claim 19, wherein a process accessing the open file is not interrupted.

21. A computer program, comprising:
first instructions for blocking input and output requests to a first part of an open file stored at a source directory;
second instructions for copying the first part of the open file from the source directory to a target directory;
third instructions for updating a record of what part of the open file has been moved;
fourth instructions for redirecting the blocked input and output requests for the first part of the open file from the source directory to the target directory;
fifth instructions for unblocking the blocked input and output requests to the first part of the open file after the first part of the open file has been copied to the target directory; and
wherein processes using the open file are not interrupted.

22. The computer program of claim 21, further comprising:
sixth instructions for redirecting all write operations to the open file to the target directory.

23. The computer program of claim 21, further comprising:
sixth instructions for creating filenames in the target directory to maintain sufficient information to move the open file back to the source directory.

* * * * *